Nov. 29, 1966 H. E. LUEBKEMANN 3,288,003
LATHE

Filed May 18, 1964 2 Sheets-Sheet 1

INVENTOR.
Harry E. Luebkemann
BY
Howard Keiser
& Jack J. Earl
ATTORNEYS

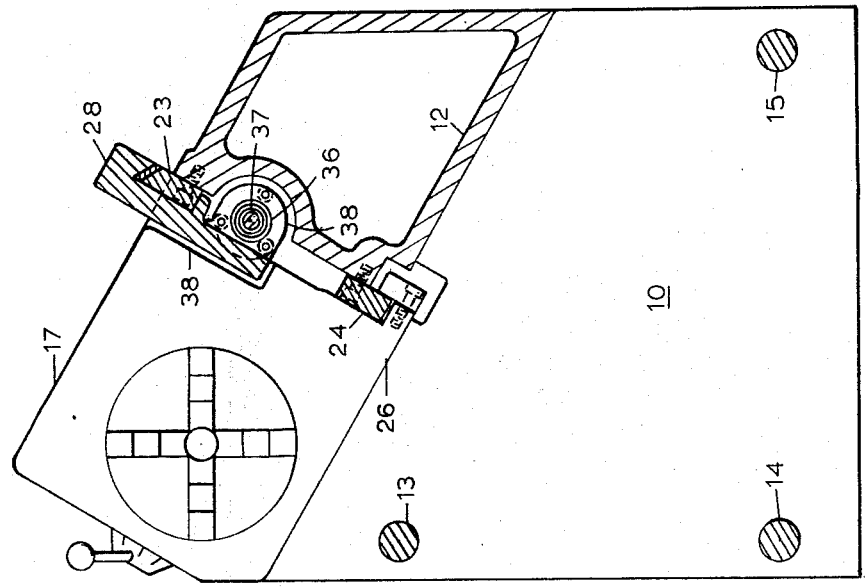
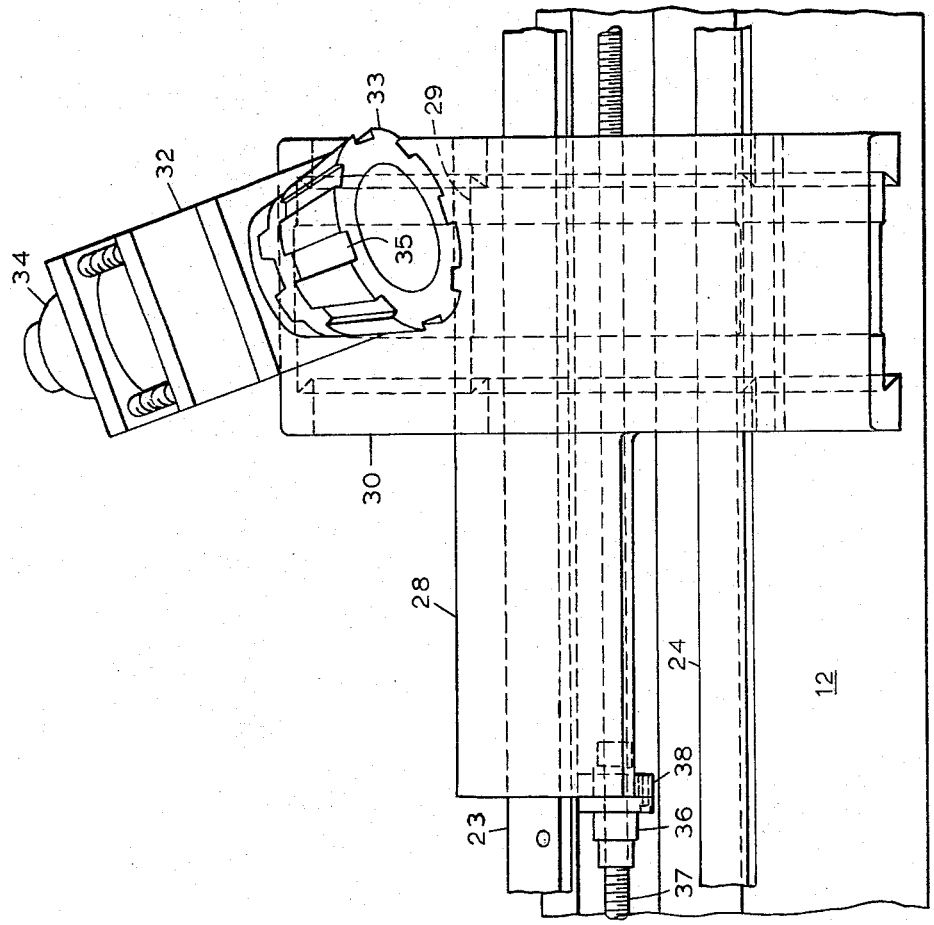

3,288,003
LATHE
Harry E. Luebkemann, Wilmington, Ohio, assignor to
The Cincinnati Milling Machine Co., Cincinnati, Ohio,
a corporation of Ohio
Filed May 18, 1964, Ser. No. 368,291
3 Claims. (Cl. 82—2)

This invention relates to a lathe of improved configuration and organization.

It is an object of this invention to provide a lathe in which the headstock and spindle mechanism can be assembled as a separate unit and thereafter be attached to the machine bed conveniently and in a precisely located position relative to the longitudinal ways of the machine.

It is a further object of this invention to provide a saddle mechanism allowing feed movement of the saddle to be effected by a towing force well in advance of the cutting tools to provide improved saddle stability during cutting and in which the saddle is movable to a position in close proximity to the headstock.

Another object of this invention is the provision of a unique combination of headstock, saddle and ways to allow the tailstock to be positioned on the same ways as the saddle while providing adequate bearing areas for the saddle and without interference between the units.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form a lathe constructed in accordance with this invention includes a detachable headstock and spindle housing which is positioned on the inclined top of the lathe bed at the headstock end of the machine. A pair of longitudinal flat ways are located toward the rear of the machine parallel to one another and with one received above and to the rear of the other. The ways extend to a position behind the headstock and spindle housing and this housing has a locating surface provided thereon that is received directly against the lower one of the ways to position the spindle at an exact perpendicular distance from the ways. The machine includes a saddle of the general shape of an inverted and reversed "L" so that one arm portion of it extends parallel to the upper one of the ways and toward the headstock unit while the other arm portion extends to bridge across the two ways. The headstock is recessed in the area adjacent to the upper one of the ways so that the saddle portion parallel to the ways can be moved to a position behind the headstock while the other portion is brought close to the spindle side of the headstock. The portion of the saddle bridging the two ways has cross slide ways thereon perpendicular to the longitudinal ways and a cross slide, movable thereon, carries cutting tools which are therefore movable toward and away from the axis of the machine spindle. The same ways which support the saddle also support a tailstock unit which extends outward in a cantilever manner toward the axis of spindle rotation. The saddle can be retracted toward the tailstock to locate the cross slide in a position immediately adjacent thereto without interference between the two. A feed screw extends parallel to the longitudinal ways and is engaged by a nut that is attached to the saddle at the end of the arm portion that extends parallel to the ways and toward the headstock so that the entire saddle is towed toward the headstock during the feed movement.

A clear understanding of the construction and operation of the lathe of this invention can be obtained from the following detailed description in which reference is made to the attached drawings wherein:

FIG. 3 is an enlarged front view in elevation of the lathe saddle.

FIG. 4 is a section view of the lathe taken on the plane 4—4 indicated in FIG. 1.

Figure 2:
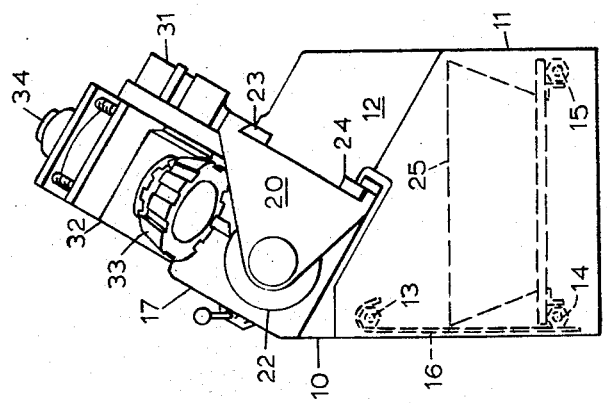
FIG. 2 is a right side view in elevation of the lathe of FIG. 1.
Figure 1:
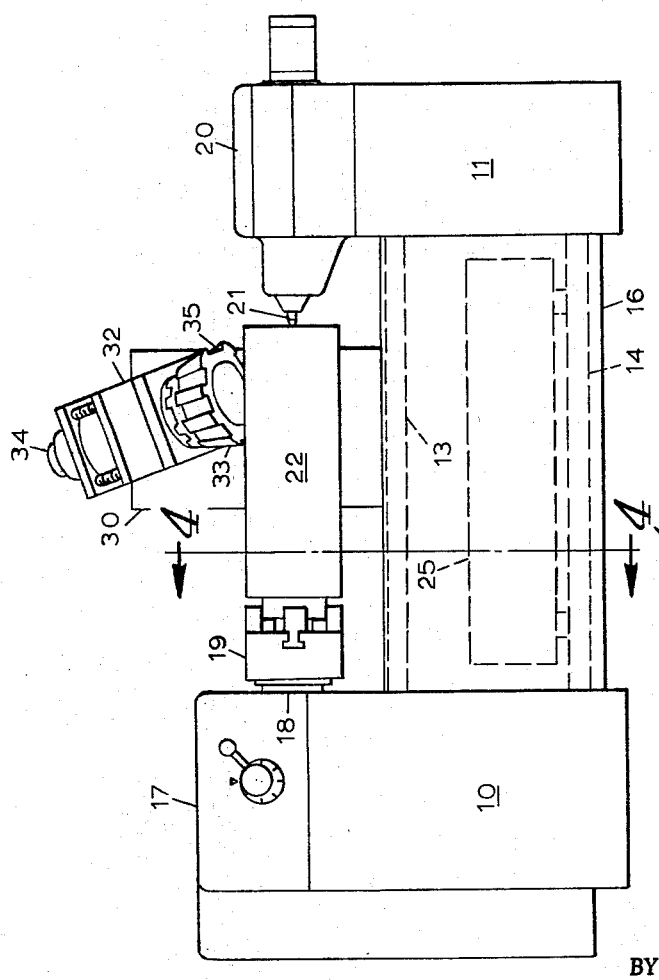
FIG. 1 is a front view in elevation of a lathe.

The base of the machine of this invention, shown in FIGS. 1 and 2 in its preferred form, is comprised of a leg 10 at the headstock end of the lathe and a leg 11 at the tailstock end of the lathe connected by a bridge member 12 that extends from the headstock leg 10 to the tailstock leg 11 at the rearward portions thereof. The headstock leg 10 and tailstock leg 11 are also shown connected together by three tie rods 13, 14 and 15 which provide additional rigidity of the machine as it is constructed. A sheet metal cover 16 is hung from the tie rod 13 at the front of the machine to cover the area between the headstock leg 10 and footstock leg 11. The headstock leg 10 supports the headstock and spindle unit 17 which includes a spindle 18 extending outward from its side toward the tailstock leg 11. A conventional chuck unit 19 is attached to the spindle 18 for support of one end of a workpiece 22. A tailstock unit 20 with a center 21 adapted to engage and support the other end of the workpiece 22 is received in a cantilever manner on ways 23 and 24. The ways 23, 24 are fixed on and extend longitudinally along the bridge member 12 from a location behind the headstock unit 17 to the footstock end of the lathe. The ways 23 and 24 are the longitudinal ways of the machine and are received in parallel relationship with the way 23 above and rearward from the way 24. A waste chip receptacle 23 is received on top of the tie rods 14 and 15, behind the cover panels 16 and below the workpiece 22. The receptacle 23 is removable from the front of the machine after the cover panel 16 has been lifted off of the rod 13.

As shown in FIG. 4 the headstock unit 17 is received on an inclined surface 26 that forms the top of the headstock leg 10. The headstock unit 17 has a locating surface accurately machined thereon that is received directly against the lower longitudinal way 24 which extends behind the headstock unit above the headstock leg 10. The headstock unit 17 is securely drawn down against way 24 by a clamp strip 27 that is bolted to the headstock unit 17 after positioning of the headstock unit 17 on top of the headstock leg 10. In this manner the spindle 18 is located at a known perpendicular distance from the ways 24 and 23 and a convenient method of assembly of the headstock and bed is provided. Additional hold-down bolts are provided, but not shown, between the headstock unit 17 and the leg 10 through the surface 26 and these are secured after positioning of the headstock 17 against the way 24.

The longitudinal ways 23 and 24 which support the tailstock unit 20 also support a saddle unit 28 for longitudinal movement between the tailstock unit 20 and headstock unit 17. As shown in FIG. 3, the saddle unit 28 is of the same general shape as an inverted and reversed "L" with a first arm portion extending along the longitudinal ways 23 toward the headstock unit 17. The other arm portion of the saddle unit 28 extends in a direction perpendicular to the first arm portion and bridges across the ways 23 and 24. The other portion of the saddle unit 28 that bridges the ways 23 and 24 has a dovetail way 29 therealong which also extends in the direction perpendicular to the ways 23 and 24. The dovetail way 29 receives a cross slide member 30 which is movable on the dovetail way 29 by a motor and screw feed unit 31, shown in FIG. 2. Motor and screw feed units like the one indicated in FIG. 2 are conventional and well known in the art and further detailed description of this feed unit 31 is deemed unnecessary since it forms no part of the present invention. The cross slide 30 has an arm 32 that extends upward and outward therefrom to support a rotatable tool turret 33 from its lower side. The upper side of the arm 32 supports an indexing motor unit 34 which is connected to the turret 33 and is selectively operable to index the turret 33 to any one of a plurality of positions. As shown, the turret 33 is of a truncated conical shape with slots 35 extending along the inclined outer peripheral surface thereof. The slots 35 are adapted to hold lathe tools of conventional form by clamp means such as set screws, not shown in the figures. The turret 33 is oriented on a skewed axis so that its side nearest the headstock is also nearest the workpiece 22. By reason of this arrangement only one lathe tool is adapted to engage the workpiece at any time and the other tools in the slots 35 are above and to the rear of that one tool which is nearest to the headstock unit 17 and workpiece 22. The tool turret 33 and its index mechanism 34 are described in detail in the copending application of Harry E. Luebkemann and Robert J. Huff and entitled "Lathe Turret" filed on the same date as the present application and assigned to the same assignee. Since the turret 33 is described in detail in the cited copending application, further detailed description of the turret 33 is not undertaken in the present application.

The first arm of the saddle 28 that extends parallel to the way 23 and toward the headstock unit 17 has a yoke 38 which is attached to and extends outward from the back side thereof and which has a nut 36 secured thereto. The nut 36 is engaged over a screw 37 that extends outward from the headstock unit 17 and parallel to the ways 23, 24. The screw 37 is rotated by conventional mechanism in the unit 17 and is not described in further detail herein since mechanisms of this type are well known in the machine tool art and particularly in feed transmission mechanisms of lathes. The screw 37 and nut 36 may be of any conventional type such as, for example, a ball bearing screw and nut of the type well known in the art. The direction of feed, as viewed in FIG. 3, is from right to left. It can be seen that the nut 36 is positioned at the extreme leftward end of the saddle unit 28 and therefore the force created between the screw and nut 37, 36, respectively, is a towing or pulling force acting on the saddle unit 28 at its extreme left end. Due to the spacing between the nut 36 and the cross slide 30, the force of the pull producing feed motion of the saddle 28 aids in holding the saddle 28 down against the way 23 despite the reactive forces from cutting which would tend to swing the saddle unit 28, and particularly the arm parallel to the way 23, away from the way 23. The displacement of the location of application of feed force gives that force a mechanical advantage when acting on the saddle 28 which requires much greater forces to overcome than are required in conventional lathes in which the feed force is transferred to the saddle at some location close to the location of the cross slide. For this reason the saddle of the present lathe is much more stable under cutting conditions and especially heavy cutting conditions than lathes known heretofore. It should also be pointed out that the bearing area on the way 23 is increased due to the length of the saddle 28 along that way and that the greatest part of the reactive forces from cutting are caused to be borne by the way 23 since the turret 33 is located above the work 22 and is supported on the cross slide 30 above the way 23. Due to the large bearing surface between the saddle 28 and the way 23, the loading here is not excessive. The way 24 receives very little additional bearing load resulting from the reactive cutting forces and therefore the area along that way is reduced from the amount of bearing area along the way 23 without harmful effect.

In order to have satisfactory performance of the lathe described, the tool turret 33 must be movable to a position very close to the chuck unit 19 so that the workpiece 22 can be turned right up to the gripping portion of the chuck. Therefore as shown in FIG. 4, the headstock unit 17 has a recessed area 38 along its back side adjacent to and spaced from the way 23. This allows the arm of the saddle unit 28 that extends parallel to the way 23 to move to a position behind the headstock unit 17. When the saddle 28 is moved to this position behind the headstock unit 17, the turret 33 is pulled to a position immediately adjacent to the chuck unit 19 and therefore the workpiece 22 can be turned as required. The headstock unit 17 is nevertheless securely attached to the headstock leg 10 along the surface 26 and against the way 24 as described.

From the foregoing detailed description it can be seen that a unique lathe configuration is provided in which the headstock unit 17 is conveniently and accurately positionable on the headstock leg 10 at a perpendicular distance from the ways 24 and 23 that can be accurately established before assembly. It can further be seen that the saddle unit 28 is movable along the same set of ways 23 and 24 on which the tailstock unit 20 is attached. This is possible even though the saddle unit 28 is movable between positions which enable the tool turret 33 to be positioned at the tailstock unit 20 or in a position immediately adjacent to the lathe chuck unit 19. Therefore the range of operation of the lathe is in no way restricted by the provision of only one set of ways. While the invention has been described in connection with one possible form or embodiment thereof, it is to be understood that the present disclosure is illustrative rather than restrictive and that changes and modifications may be made without departing from the spirit of the invention or the scope of the claims which follow.

What is claimed is:
1. A lathe comprising in combination:
 (a) a bed,
 (b) a pair of longitudinal ways extending parallelly along said bed, one of said ways received above and rearward from the other way,
 (c) a locating surface at one end of said bed and extending toward said ways,
 (d) a headstock unit received on said locating surface and against said other way, said headstock unit having a recessed area therebehind adjacent to said one way to provide a space therebetween,
 (e) a tailstock unit received on said ways in a cantilever manner and spaced from said headstock unit,
 (f) a saddle unit received on said ways between said headstock and tailstock units, said saddle having one arm portion extending toward the headstock unit parallel to said one way and bearing thereagainst and another arm portion extending therefrom and bridging across said ways,
 (g) a cross slide received on said other saddle arm portion for movement therealong, and
 (h) means for moving said saddle along said ways to move said cross slide between spaced positions adjacent to said headstock and tailstock, said one saddle arm portion extending into the space between said one way and the headstock unit when said cross slide is adjacent to said headstock unit, said means including
  (1) a feed screw supported parallel to said ways and
  (2) a nut engaged over said feed screw and attached to said saddle at the end of said one arm portion toward said headstock unit.
2. A lathe comprising in combination:
 (a) a bed,
 (b) a pair of longitudinal ways extending parallelly along said bed, one of said ways received above and rearward from the other way, (c) a locating surface at one end of said bed defining a plane area inclined front to rear in a direction perpendicular to said longitudinal ways and extending parallel thereto, (d) a headstock unit received on said locating surface and against said other longitudinal way, said headstock unit having a recessed area therebehind adjacent to said one longitudinal way to provide a space therebetween and further having a spindle extending laterally therefrom toward the other end of said longitudinal ways and adapted to support one end of a workpiece, (e) a tailstock unit received on said longitudinal ways in a cantilever manner and spaced from said headstock unit, said tailstock unit adapted to support the other end of the workpiece, (f) a saddle unit received on said longitudinal ways between said headstock and tailstock units, said saddle unit having one arm portion extending toward said headstock unit parallel to said one longitudinal way and bearing thereagainst and another arm portion extending therefrom and bridging across said longitudinal ways, (g) a cross way extending along said other saddle arm portion and perpendicular to said longitudinal ways, (h) a cross slide received on said cross way and including means for holding a cutting tool above and on the rearward side of the workpiece, (i) a feed screw supported parallel to said longitudinal ways, and (j) a nut engaged over said feed screw and attached to said saddle at the end of said one saddle arm portion toward said headstock, said feed screw and nut operable to produce and transmit a towing force to pull said saddle from one position with said other saddle arm portion adjacent to the tailstock unit to another position with said other saddle arm portion adjacent to the headstock unit wherein said one saddle arm portion extends into said space between said headstock unit and said one longitudinal way.

3. The lathe of claim 2 wherein:

(a) said bed includes a headstock leg, a tailstock leg and a bridge portion extending between said leg portions at the rearward sides thereof, (b) said longitudinal ways extend along said bridge portion, and (c) a plurality of additional tie rods are spaced from said bridge portion and extend between said leg portions and provide additional rigidity of said bed.

References Cited by the Examiner

UNITED STATES PATENTS

| | | | |
|---|---|---|---|
| 1,957,667 | 5/1934 | Ritter et al. | 82—2 |
| 2,080,207 | 5/1937 | Hoppe | 82—2 |
| 3,124,985 | 3/1964 | Curtis et al. | 82—32 X |
| 3,186,267 | 6/1965 | Pabst et al. | 82—2 |

WILLIAM W. DYER, JR., *Primary Examiner.*

LEONIDAS VLACHOS, *Examiner.*